United States Patent
Yuan et al.

(10) Patent No.: US 12,093,586 B2
(45) Date of Patent: Sep. 17, 2024

(54) ADDING A WATERMARK ON A DOCUMENT FOR PRINTING IN A VIRTUAL DESKTOP INFRASTRUCTURE (VDI) ENVIRONMENT

(71) Applicant: VMware, Inc., Palo Alto, CA (US)

(72) Inventors: Hui Yuan, Beijing (CN); Kun Shi, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/143,075

(22) Filed: May 4, 2023

(65) Prior Publication Data

US 2024/0241678 A1 Jul. 18, 2024

(30) Foreign Application Priority Data

Jan. 18, 2023 (WO) ................ PCT/CN2023/000012

(51) Int. Cl.
*G06F 3/12* (2006.01)
*B42D 25/333* (2014.01)

(52) U.S. Cl.
CPC .......... *G06F 3/1243* (2013.01); *G06F 3/1204* (2013.01); *G06F 3/1285* (2013.01); *B42D 25/333* (2014.10)

(58) Field of Classification Search
None
See application file for complete search history.

(56) References Cited

U.S. PATENT DOCUMENTS

| | | | |
|---|---|---|---|
| 8,655,074 B2 * | 2/2014 | Kim ....................... | G06V 20/62 382/176 |
| 2003/0014441 A1 * | 1/2003 | Suzuki ..................... | G06F 16/93 715/255 |
| 2006/0126096 A1 * | 6/2006 | Yasukaga .............. | G06F 40/174 358/1.14 |
| 2011/0122438 A1 * | 5/2011 | Someya ............. | G06K 15/1831 358/1.15 |
| 2011/0286031 A1 * | 11/2011 | Jessen .................... | G06F 3/1239 358/1.15 |
| 2019/0369929 A1 * | 12/2019 | Yokouchi .............. | G06F 3/1243 |
| 2021/0141579 A1 * | 5/2021 | Yuan ....................... | G06F 3/121 |

* cited by examiner

*Primary Examiner* — Haris Sabah
(74) *Attorney, Agent, or Firm* — Kim & Stewart LLP

(57) ABSTRACT

Example methods and systems are described to add a watermark for printing in a virtual desktop environment having an agent side and a client side. A watermark can be configured at the agent side for printing at the client side. At the agent side, a fallback font can be determined for text of the watermark, and coordinate space calculation can be performed, so that the watermark prints correctly at the client side.

21 Claims, 14 Drawing Sheets

ADDING A WATERMARK ON A DOCUMENT FOR PRINTING IN A VIRTUAL DESKTOP INFRASTRUCTURE (VDI) ENVIRONMENT

CROSS-REFERENCE TO RELATED APPLICATION

The present application claims the benefit of Patent Cooperation Treaty (PCT) Application No. PCT/CN2023/000012, filed Jan. 18, 2023, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a desktop to run on a VM that is provided by a hypervisor on a host. A user/client uses the operating system (OS) and applications (which reside and execute at the VM) via an endpoint device of the user, just as if the OS/applications were actually running locally on the endpoint device.

VDI implementations provide the user with printing capability, so that the user can issue print jobs from the virtual desktop at the VM, and then the printing is performed at a physical printer that is connected to the user's endpoint device (client device). It is sometimes useful for a printout from a printer to include a watermark. However, some physical printers (which perform printing from print jobs issued from virtual desktops) do not have the capability to insert watermarks in their printouts.

DETAILED DESCRIPTION

Figure 1:
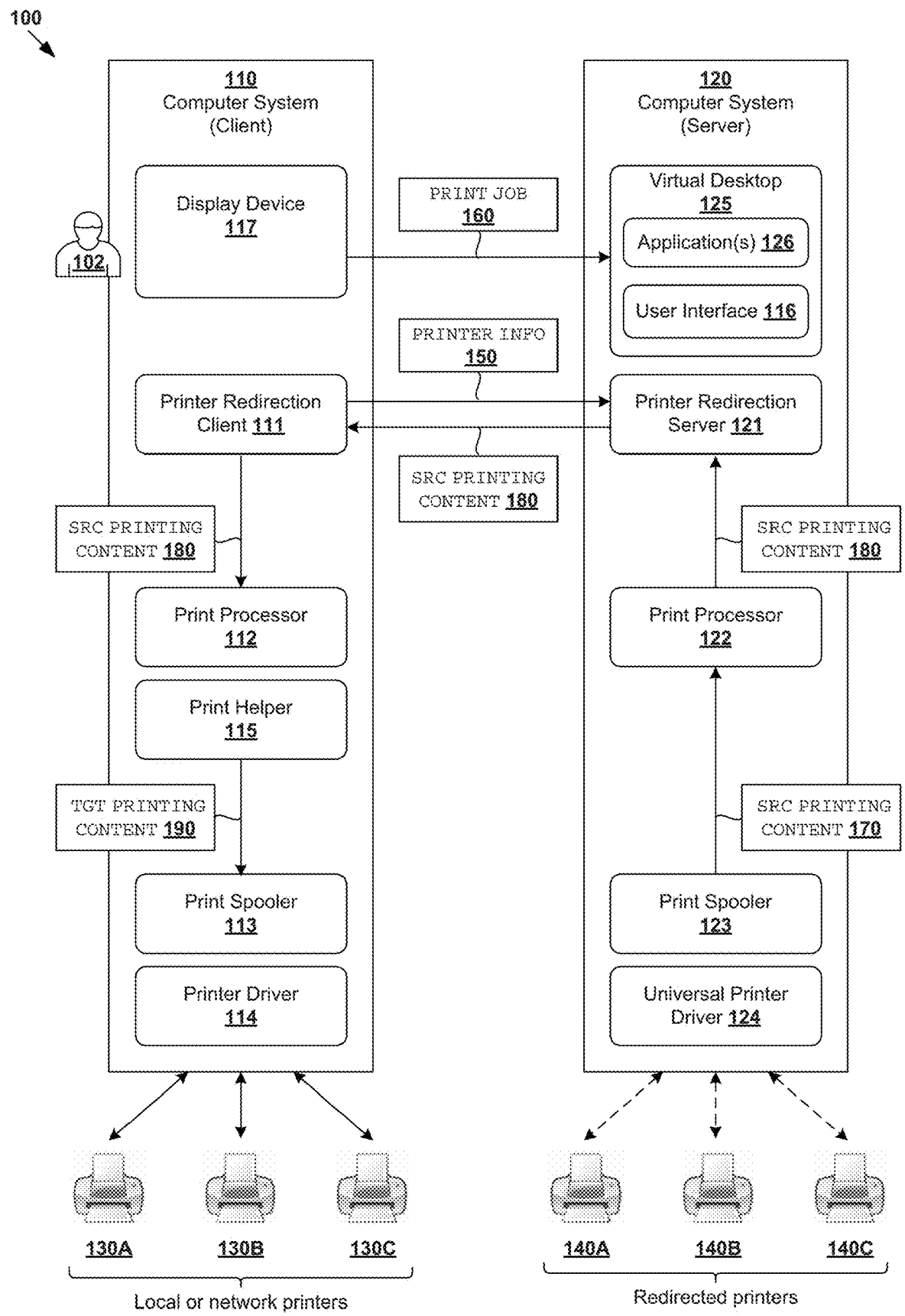
FIG. 1 is a schematic diagram illustrating an example virtualized computing environment that can implement a virtual desktop infrastructure (VDI) with printing capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure enables the printing of watermarks in a virtual desktop infrastructure (VDI) environment in which a physical printer itself may not have support for printing watermarks. The embodiments described herein enable watermarks to be configured at the agent side for printing at the client side.

For example, in a printing redirection implementation that uses a universal print driver or other type of print driver, the embodiments disclosed herein enable all printers to print with a self-defined watermark, even if the physical printer at the client side does not support the printing of watermarks. The redirection printer at the agent side is able to be configured for printing a watermark, and this capability is extended to the physical printer at the client side.

A common user interface (UI) may be provided at the agent side, which allows a user to customize the content (e.g., text) and style (e.g., font) of the watermark. Fallback font determination and coordinate space calculation/revision may be performed at the agent side to ensure that the watermark prints properly on the page at the physical printer.

Computing Environment

FIG. 1 is a schematic diagram illustrating an example virtualized computing environment that can implement a VDI with printing capability. Specifically, FIG. 1 shows example network environment 100 in which capability to print watermarks may be implemented. Depending on the desired implementation, network environment 100 may include additional and/or alternative components than that shown in FIG. 1. Here, network environment 100 may include first computer system 110 (e.g., a client, at a client side) that is connected with second computer system 120 (e.g., a server or other agent, at an agent side) over a physical network (not shown for simplicity). In one example, virtual desktop infrastructure (VDI) technology may be implemented in network environment 100. In this case, computer system 110 may include any suitable software and/or hardware to facilitate user's 102 remote access to virtual desktop 125, which may be implemented using one or more virtual machines (VMs) supported by server 120. Through virtual desktop 125, user 102 may access various applications 126, such as word processing application, web browser, email application, videoconferencing application, etc. Example VMs will be discussed further using FIG. 14.

For printing purposes, computer system 110 may be connected to multiple physical local or network printers, including printers 130A-C. To enable user 102 to print from virtual desktop 125 to any of printers 130A-C, computer system 110 and server 120 may include corresponding client-server components. On the client side, computer system 110 may include printer redirection client 111, print processor 112, print helper 115, print spooler 113, and printer driver 114. On the server (e.g., agent) side, server 120 may include printer redirection server 121, print processor 122, print spooler 123, and universal printer driver (UPD) 124.

When computer system 110 establishes a connection with server 120, configuration information may be sent to server 120, including information associated with printers 130A-C (see 150 in FIG. 1). Based on the configuration information, server 120 may configure virtual printers 140A-C that correspond with respective physical printers 130A-C. Universal printer driver 124 on server 120 may be configured to support various printer types and/or native printer driver(s) may be installed. This way, printer redirection may be performed to enable user 102 to send a print job from virtual desktop 125 running on server 120 to one of printers 130A-C connected to computer system 110. In practice, printing from virtual desktop 125 or virtual application(s) 126 is known as virtual printing.

Printer redirection may be implemented using any suitable approach, such as using VMware® Integrated Printing (VIP) solution, etc. For example, user 102 may operate display device 117 in order to access user interface 116 provided by virtual desktop 125, so as to initiate a print job (see 160 in FIG. 1) to print a document using target printer 130A. User 102 may also access/use user interface 116 to configure a watermark to be placed/included in the document to be printed. For example, the print job may be initiated using a word processing application (e.g., application 126) supported by virtual desktop 125. In response, print spooler 123 on the server side may generate printing content (referred to as "source printing content"), which is then processed by print processor 122 (see 170-180 in FIG. 1). Any suitable processing may be performed by print processor 122, such as adding watermark(s) to source printing content 170 to extend printer's capability, etc., in a manner that will be described in further detail below. Source printing content 180 is then sent from print redirection server 121 towards print redirection client 111.

On the client side, print redirection client 111 may receive and direct source printing content 180 towards print processor 112 capable to initiate the localized printing of a document having a watermark according to examples of the present disclosure. Source printing content 180 may be transformed into target printing content 190 (e.g., a print job at the client side). In practice, a default print choice may be configured to either print directly using one of printers 130A-C or generate a print preview before printing. When print preview is selected by user 102, print helper 115 (and/or a print previewer) may generate a print preview for review prior to printing by target printer 130A. Print processor 112 and/or print helper 115 may in turn send target printing content 190 to printer 130A for printing a printout, such as a document having a watermark.

Figure 2:
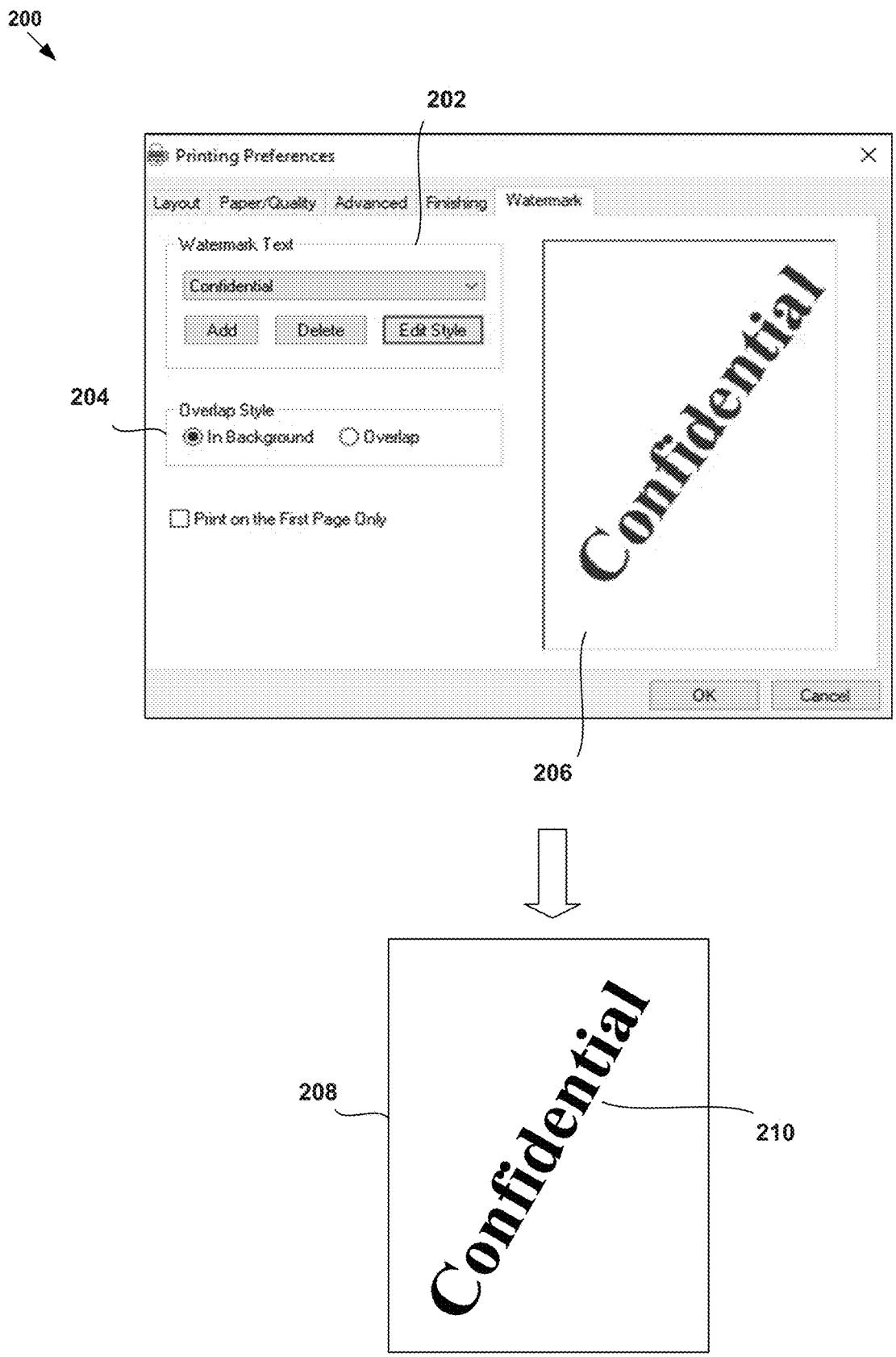
FIG. 2 illustrates an example user interface that may be used to configure watermarks for the VDI of FIG. 1.

FIG. 2 illustrates an example user interface (e.g., user interface 116 provided by virtual desktop 125) that may be used to configure watermarks for the VDI of FIG. 1. User interface 116 may include one or more graphical user interfaces (GUIs) or windows that include various elements to facilitate a user's selection. Example user interface elements may include checkbox(es), button(s), window(s), tab(s), list(s), dropdown list(s), menu(s), or any combination thereof, etc. Other suitable user interfaces may include command line interface (CLI), application programming interface (API), etc. As an example, one or more windows 200 may be provided by user interface 116 to enable user 102 to configure printing preferences.

As depicted in the example of FIG. 2, window 200 enables user 102 to configure watermarks to be placed on/in a document. Watermark information that may be configured via window 200 may include watermark text 202. For watermark text 202, user 102 may provide the text (e.g., characters) of the watermark (e.g., "Confidential"), as well as specifying the style or other details of the watermark (e.g., font, font size, solid/outline format, orientation/position, color, background shading, text appearance such as bold, underline, italic, etc. and various other details). Window 200 may also enable user 102 to specify an overlap style 204 for the watermark, such as "In Background" or "Overlap." A preview pane 206 shows the watermark as configured by user 102.

A result of the watermark configuration is a document 208 that may be printed at one of the printers 130A-C. The document 208 includes a watermark 210 as configured by user 102. In this example, the watermark 210 has a diagonal orientation along a center diagonal of the document 208. Other orientations or locations of the watermark are possible. Information that enables the document 208 to be printed with the watermark 210 may be contained in source printing content 180 shown above with respect to FIG. 1.

Here, the term "source printing content" may refer generally to printing content that contains watermark information, and "target printing content" to printing content that is the same or modified version of the source printing content 180 and that is sent to the print spooler 113 at the client. As will be explained below, the source/target printing content 180/190 may include any spool (SPL) file information, spool shadow (SHD) file information, etc.

For example, the SPL file information may include spooled information in any suitable format, such as enhanced metafile (EMF), etc. In practice, EMF and RAW are spool file formats used in printing by operating systems such as Microsoft Windows®, etc. EMF is a file format that may be used to store portable (i.e., device-independent) representations of images. Further, the SHD file information may include information associated with print job settings, such as printer name, document name, a copy of a DEVMODE structure, etc. The SHD file information is usually created alongside the SPL file information.

The structure of the EMF format may include a sequence of variable-length records that include drawing commands, object definitions, and graphics properties to render a graphical image on any output device. Different EMF records (EMRs) may have different attributes, the values of which are defined using data within the EMF content. In the embodiments disclosed herein, EMF record(s) associated with a watermark may be modified and/or created, and inserted into an EMF.

Watermark Configuration and Printing

Figure 3:
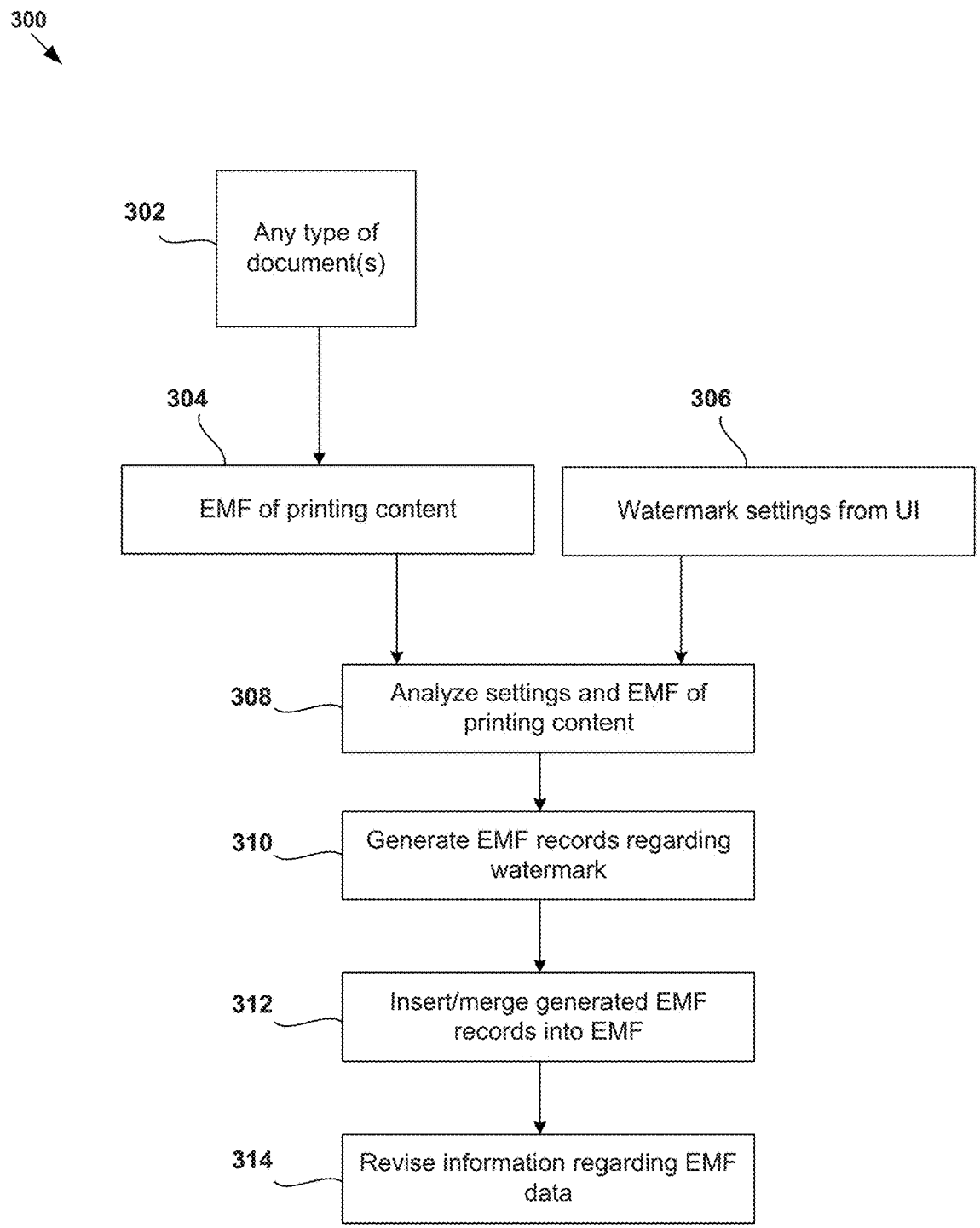
FIG. 3 is a flowchart of an example method that may be performed at an agent side to add a watermark to a document.

For example and with reference next to FIG. 3, a method 300 may be performed at the agent side (e.g., by print processor 122 and/or other component(s) at the agent side) to add a watermark to a document. Method 300 may include one or more operations, functions, or actions illustrated by one or more blocks, such as 302 to 314. Depending on the desired implementation, various blocks of method 300 (and of any other method described herein) may be combined into fewer blocks, divided into additional blocks, supplemented with other blocks, and/or eliminated. Furthermore, the various operations depicted in the blocks do not necessarily have to be performed in the exact order shown—some operations may be performed in sequence, in parallel, dependently or independently of each other, etc. in various embodiments.

User 102 operates UI 116 and virtual desktop 125 to initiate a print job of one or more documents 302, which may be any type of document. An EMF 304 of the printing content of document 302 is generated. User 102 may also operate window 200 of UI 116 to configure watermark settings 306 for the document 302.

At a block 308, print processor 122 analyzes the watermark settings 306 and the EMF 304. Based on this analysis, print processor 122 generates (at a block 310) EMF records regarding the watermark. The generated EMF records are then inserted/merged into the EMF 304, at a block 312. Other information regarding the EMF 304 (e.g., data in the EMF 304 after having the EMF records merged into it) may be revised, at a block 314. Further details regarding blocks 310-314 will be provided below, including generating new and/or modified EMF records associated with fallback fonts, coordinate space calculation for diagonal printing of watermarks, etc.

Figure 4:
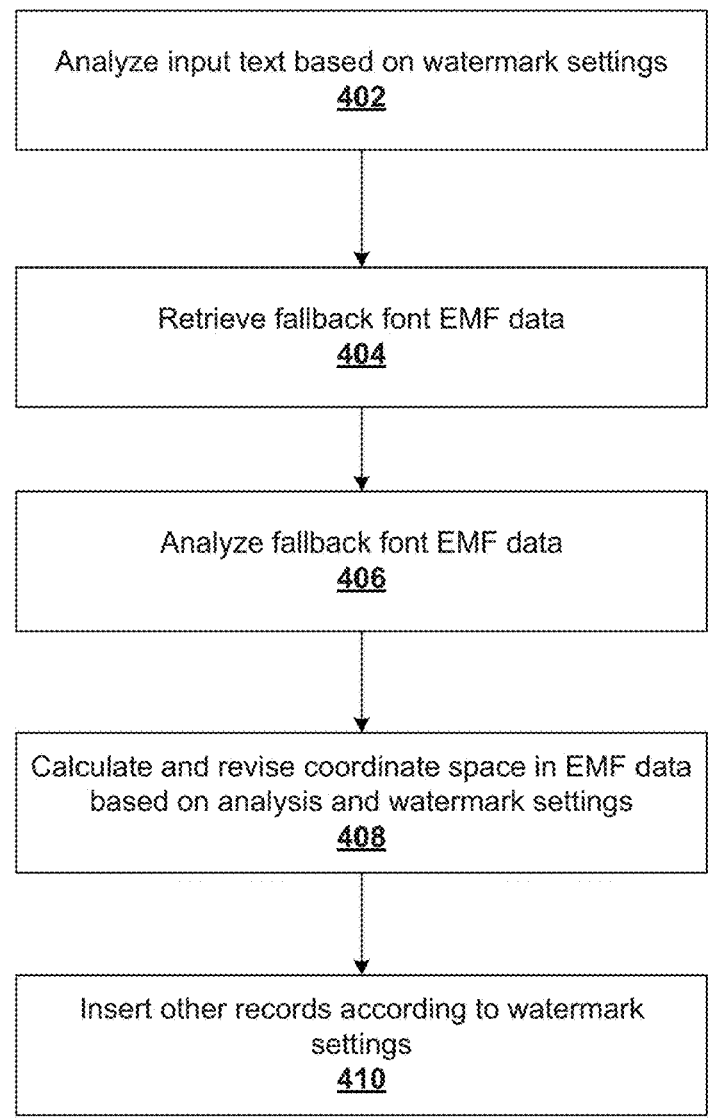
FIG. 4 is a flowchart of an example method to generate watermark records.

For example, FIG. 4 is a flowchart of an example method 400 to generate watermark records. The operations of method 400 may correspond to at least block 310 of method 300 shown in FIG. 3, and may be performed by print processor 122 and/or other component(s) at the agent side.

At a block 402, input text is analyzed based on watermark settings. For example and with reference to FIG. 2, the input text may be watermark text 202 provided by user 102 via window 200 of UI 116. The input text may be analyzed at block 402 to determine the characters in the input text, the styles of the input text, etc. An application program interface (API) or other tool or function may be called to perform analysis of a text string.

It is possible that the characters in the input text do not belong to (or are otherwise unable to be represented by) the same font. For example, the input text of the watermark may be a mix of Chinese and Roman script characters, such as "水印 ab". If the chosen font (e.g., a font selected by user 102 using window 200 of UI 116) is "Times New Roman", the Roman script characters "ab" may be depicted by the chosen font, but the Chinese characters " "水印" " are unable to be depicted by that chosen font.

Hence, a fallback font is identified/selected for the above characters that are not contained within the chosen font. The fallback font may be any suitable font that accurately displays the character(s) and which may be different from the chosen font. EMF data having one or more fallback fonts is retrieved at a block 404, and is analyzed at a block 406 to identify a fallback font that may be used for the characters. For example, the font "Microsoft Sans Serif" may be identified and selected as the fallback font for the Chinese characters " "水印"."

At a block 408, the coordinate space in the EMF data is calculated and revised based on one or more of the analyzed input text, the analyzed fallback font, and the watermark settings. The coordinate space calculation/revision may be performed, for example, to ensure that the watermark fits within the dimensions of the page of the document, such as when the watermark is printed in a diagonal orientation.

New and/or revised EMF records are generated as output from the analysis and inserted into the EMF, at a block 410. These EMF records may contain information regarding the characters in the watermark (including their fonts), their properties/style, their location on the document, and any other information to enable the watermark to be properly printed and displayed on the document in accordance with the watermark settings chosen by user 102.

According to some embodiments, the input text may be split into multiple EMF records. In the present example of the watermark having characters "水印 ab", there may be four separate EMF records for each respective character. As an alternative, there may be two separate EMF records, with a first EMF record for the Chinese characters and a second EMF record for the Roman script characters. Other ways of splitting the input text into EMF records are possible.

Some example EMF records will be discussed using FIG. 5, which is a schematic diagram illustrating example structure 500 of EMF format. In practice, EMF is the Windows® format for rendering a print job. As a 32-bit version of the original Windows metafile (WMF) format, EMF was introduced in the early 1990s to solve deficiencies of the WMF format. EMF content is designed to be portable between applications. When an EMF metafile is "played back" on a specific device, the resulting image or graphics object (including text) maintains the same dimensions, shape, proportions, color, and so on, as the original.

Figure 5:
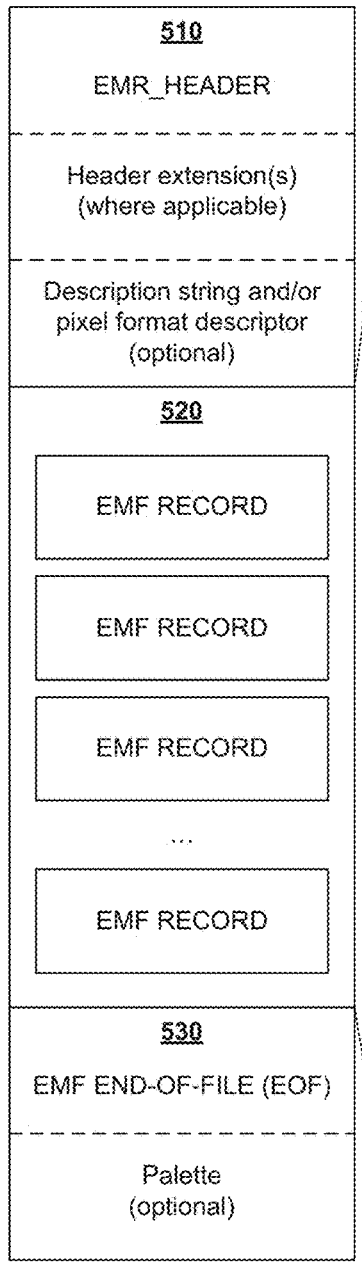
FIG. 5 is a schematic diagram illustrating an example structure of enhanced metafile (EMF) format.

In the example in FIG. 5, an EMF metafile may include EMF header record 510, EMF record(s) 520, EMF end-of-file (EOF) record 530 and an optional palette. At 510, the EMF header record may specify information associated with the structure and contents of the metafile. At 520, the EMF record(s) may specify a sequence of drawing orders, property settings, and object definitions (including those related to text/characters). At 530, the EMF EOF record is the last record in the EMF metafile. In practice, any suitable version the EMF metafile may be used, such as original, extension 1 (with added pixel format record and support for OpenGL commands), extension 2 (with enhanced accuracy and scalability), etc.

At 540 in FIG. 5, some example bitmap record types associated with image information are shown. The bitmap record types may specify a block transfer of pixels from a source bitmap to a destination rectangle, such as EMR_ALPHABLEND (includes alpha transparency), EMR_BITBLT (includes brush pattern), EMR_MASKBLT (includes application of a color mask bitmap), EMR_PLGBLT (destination parallelogram, with the application of a color mask bitmap), EMR_SETDIBITSTODEVICE (block transfers from specified scanlines of a source bitmap), EMR_STRETCHBLT and EMR_STRETCHDIBITS (stretching or compressing output to fit dimensions of the destination, if necessary), EMR_TRANSPARENTBLT (treating a specified color as transparent), etc.

At 550 in FIG. 5, an example brush record type is shown. Here, the EMR_CREATEBRUSHINDIRECT record may define a logical brush for graphics operations. The brush record may include type (i.e., a value that identifies the record as EMR_CREATEBRUSHINDIRECT), size (i.e., size of record), ihbrush (i.e., unsigned integer specifying the index of the logical brush object in an EMF object table) and logbrush object (i.e., specifies the style, color and pattern of the logical brush).

At 560 in FIG. 5, some example pen record types are shown. Here, the EMR_CREATEPEN record may define a logical pen for graphics operations, and include attributes such as ihPen=index of a logical pen object in an EMF object table, etc. The EMR_EXTCREATEPEN record may define an extended logical pen for graphics operations. The EMR_EXTCREATEPEN record may include attributes such as ihPen=index of an extended logical pen object in an EMF object table, etc.

At 570 in FIG. 5, some example graphics-related record types are shown. For example, the EMR_ANGLEARC, EMR_ARC and EMR_ARCTO records may specify an arc. Other records may be associated with various graphics objects, such as a chord (e.g., EMR_CHORD), an ellipse (e.g., EMR_ELLIPSE), Bezier curve(s) (e.g., EMR_POLYBEZIER16 and EMR_POLYBEZIERTO16), a set of Bezier curve(s) and line segments (e.g., EMR_POLYDRAW), polygon (e.g., EMR_POLYGON), pie-shaped object (e.g., EMR_PIE), line (e.g., EMR_LINETO), etc. A specified region may be painted using a current brush based on the EMR_PAINTRGN record or the region may be filled using the EMR_FILLRGN record.

In practice, graphics objects specified in an EMF file may be used by drawing and painting operations. They may be created by object creation records during the metafile playback and saved for later use. When needed, a graphics object may be retrieved and selected into a playback device context, such as using an EMR_SELECTOBJECT record, etc. The types of reusable objects may include brushes, color spaces, fonts, palettes, pens, etc.

At 580-590 in FIG. 5, example EMF record types that are associated with textual information and/or font information may include the following: EMR_EXTTEXTOUTW/A, EMR_SMALLTEXTOUT, EMR_SELECTOBJECT and EMR_EXTCREATEFONTINDIRECTW. These will be discussed in turn below.

The EMR_EXTTEXTOUTW record draws a Unicode text string using the current font, whereas the EMR_EXTTEXTOUTA record draws an ASCII text string using the current font (i.e., latest font that is selected into a device context). Attributes in the EMR_EXTTEXTOUTW/A record may include (Chars, fOptions, StringBuffer), where chars=number of characters in the string, fOptions=whether stored in characters or glyph indices, and stringBuffer stores values (characters or glyph indices) associated with the text string.

The EMR_SMALLTEXTOUT record outputs a text string. Attributes in the record may include (cChars, fuOptions, textString), where cChars specifies the number of 16-bit characters, fOptions indicates whether the text string is stored in character codes or glyph indices and textString stores values (character codes or glyph indices) associated with the text string. The EMR_SMALLTEXTOUT record also stores ETO_GLYPH_INDEX, which is a flag indicating that the character codes in an output text string are glyph indexes. The EMR_SMALLTEXTOUT record may also specify the location where to display the text.

The EMR_SELECTOBJECT record selects an object into a playback device context. Attributes in the record may include iObject, which is an unsigned integer specifying either an index of the object in an EMF object table or the index of a stock object in an StockObject enumeration. The EMF object table may be used for managing objects during playback as the objects are created, activated, used, deactivated, and deleted by the processing of EMF records.

The EMR_EXTCREATEFONTINDIRECTW record defines a logical font object that is selectable into a playback device context by an EMR_SELECTOBJECT record. Attributes in the EMR_EXTCREATEFONTINDIRECTW record may include (facename, ihFont), where facename=type face name associated with a logical font object and ihFont=unsigned integer that specifies the index of the logical font object in an EMF object table. Other attributes that may be configured include (in addition to facename or font name) font size, font style (e.g., weight, orientation, etc.), and others.

Depending on the desired implementation, a logical font object (e.g., LogFont Object in EMF) may specify attributes of a logical font, such as height, width, escapement, orientation, weight (e.g., from zero to 1000), italic font flag, underlined font flag, strikeout font flag, character set specifying a set of character glyphs, clip precision, output precision, facename specifying a typeface name of the font, etc.

Other example EMF records (EMRs) that may pertain to watermarks may include: EMR_SETTEXTCOLOR (text color), EMR_SETTEXTALIGN (text alignment), EMR_SETBKMODE (overlap style, such as opaque or transparent), EMR_SETMAPMODE (text coordinates/space, including unit(s) of measure to transform page space unit(s) into device space unit(s), and also specifies the orientation of the device's x-axis and y-axis), and EMR_RECTANGLE and EMR_ELLIPSE (text display style). Still other examples of watermark-related EMF records may include: EMR_EXTCREATEPEN, EMR_BEGINPATH, EMR_ENDPATH, and EMR_STROKEANDFILLPATH, all of which may pertain to a display style (e.g., outline style). At least some of these EMF records are depicted in FIG. 5.

Figure 6:
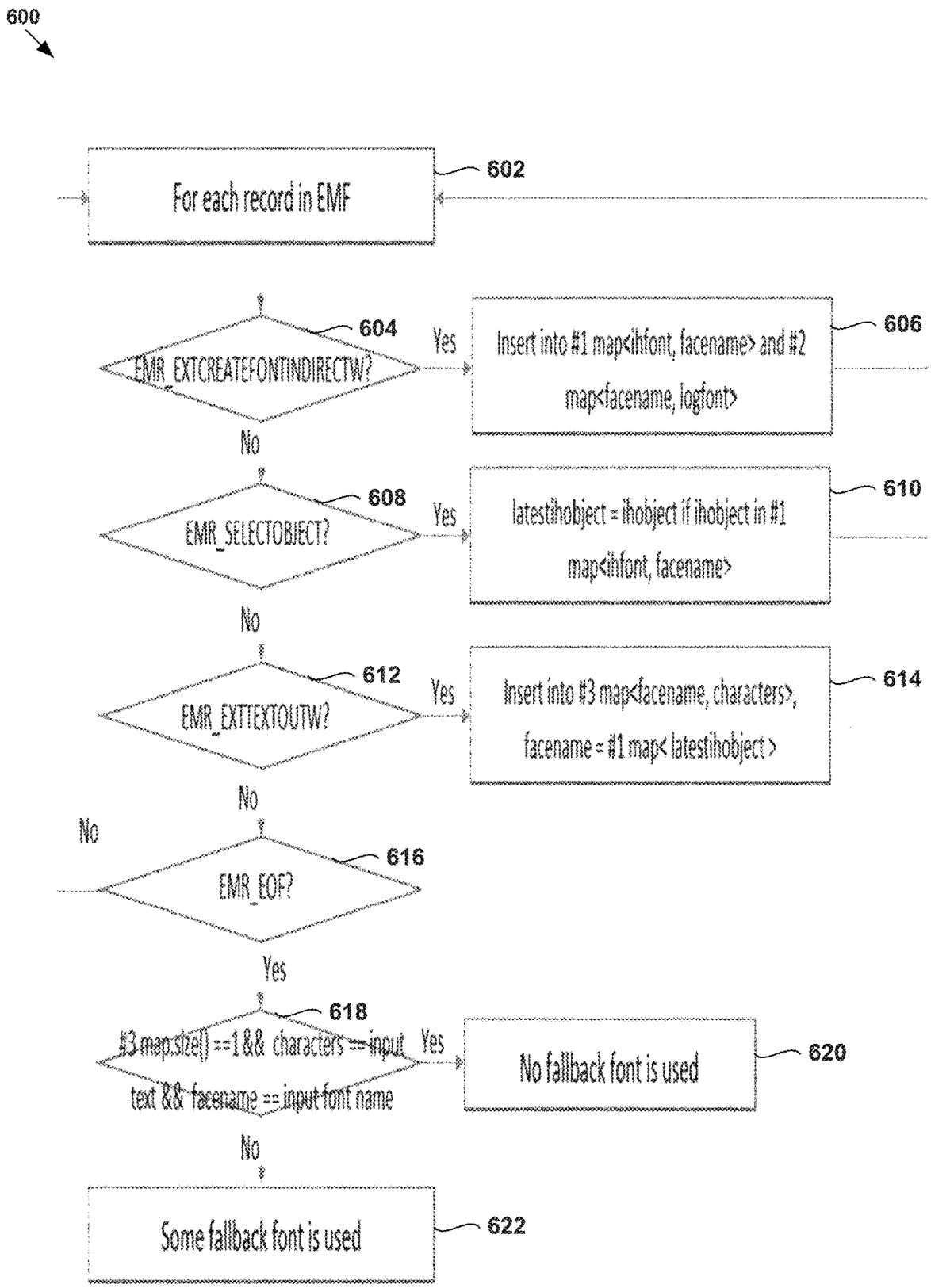
FIG. 6 is a flowchart of an example method to analyze EMF records, including analysis of a fallback font.

FIG. 6 is a flowchart of an example method 600 to analyze EMF records contained in an EMF, including analysis of a fallback font. At blocks 602-616, method 600 iterates through each of the EMF records that were generated using the analysis of FIGS. 3 and 4, until the end-of-file (EOF) EMR record is reached at the block 616. For example, the EMF records are generated at block 402, and APIs such as those provided by Microsoft, Inc. of Redmond, Washington (e.g. ScriptStringAnalyse) may be used to analyze the input regarding the text of the watermark which can be treated as a string, and the setting (e.g., font, font size, style, etc.) that will be selected into the newly created device context (DC).

Information for three maps (key-value pairs) are obtained at blocks 604-614. Maps #2 and #3 are used in method 800 of FIG. 8, and map #1 is a result that is used for obtaining map #3.

If the current EMF record is an EMR_EXTCREATEFONTINDIRECTW record at the block 604, then ihfont, facename and logfont are three of elements for this record. At the block 606, method 600 inserts <ihfont, facename> into map #1 and <facename logfont> into map #2.

If the current EMF record is an EMR_SELECTOBJECT record at the block 608, then latestihobject is a temporary variable used for recording the latest ihobject, and can be used to retrieve the font/facename information that is currently being used in the device context (DC) for printing/drawing. The variable latestihobject is updated at the block 610 to be the latest, and is used subsequently at block 614.

If the current EMF record is an EMR_EXTTEXTOUTW record at the block 612, then the record can be either EMR_EXTTEXTOUTW or EMR_EXTTEXTOUTA. At the block 614, method 600 can retrieve the facename/font currently that is currently being used (in the DC) from latestihobject, by using facename=#1 map<latestihobject>. Then, the characters can be retrieved from the elements of the record(s) EMR_EXTTEXTOUTW/EMR_EXTTEXTOUTA. Note that the record EMR_EXTTEXTOUTW/EMR_EXTTEXTOUTA may just store the glyph indices information about text to be output, and so method 600 may need to convert these glyph indices into corresponding characters. When the EOF is reached at the block 616, method 600 checks at a block 618 as to whether the size of map #3 is 1, whether the characters in map #3 correspond to the input text, and whether the facename in map #3 is the input font name (chosen by user 102). If these conditions are met, then a determination is made at a block 620 that no fallback font is used in the EMR record. Else, a determination is made at a block 622 that some fallback font is used for the characters.

In the example of the input text being "水印 ab", the chosen font (by user 102) may be "Times Roman." Since the Chinese characters ""水印"" are not contained in Times New Roman font, then a fallback font is selected that can most similarly depict these characters, such as "Microsoft Sans Serif."

Map #3 in this example will therefore be the key-value pair <facename, characters>, such as the following using unicode characters:
  <"Microsoft Sans Serif, (27700, 21360)>=<"Microsoft Sans Serif, ((水, 印)>)>
  <"Times New Roman", (97, 98)>=<"Times New Roman", (a, b)>

Map #3 may be used in subsequent operations to generate and/or modify EMF records pertaining to the watermark.

According to various embodiments, coordinate space calculation (e.g., block 408 in FIG. 4) may be performed after determining the fallback font(s). The initial coordinates in the generated EMF record EMR_EXTTEXTOUTW may not be correct, and so will need revision.

Logical inches are converted to pixels. For many years, Windows used the following conversion: one logical inch equals 96 pixels (e.g., 1 point equals 1/72 of an inch). Using this scaling factor as an example, a 72-point font (which is about 1 inch tall) is rendered as 96 pixels tall. For instance, a 12-point font is designed to fit within a 1/6" (12/72) line of text. This does not mean that every character in the font is exactly 1/6" tall. In fact, some characters might be taller than 1/6". For example, in many fonts the character A is taller than the nominal height of the font. To display correctly, the font needs some additional space between the text. This space is called the leading.

Accordingly in order for the watermark text to show properly, such as in a diagonal orientation, the corresponding coordinate space should be calculated so as to take into consideration the current printer settings, font size, character attributes, etc. The physical area versus the printable area should also be considered so that the watermark prints within the printable boundaries of the page.

Figure 7:
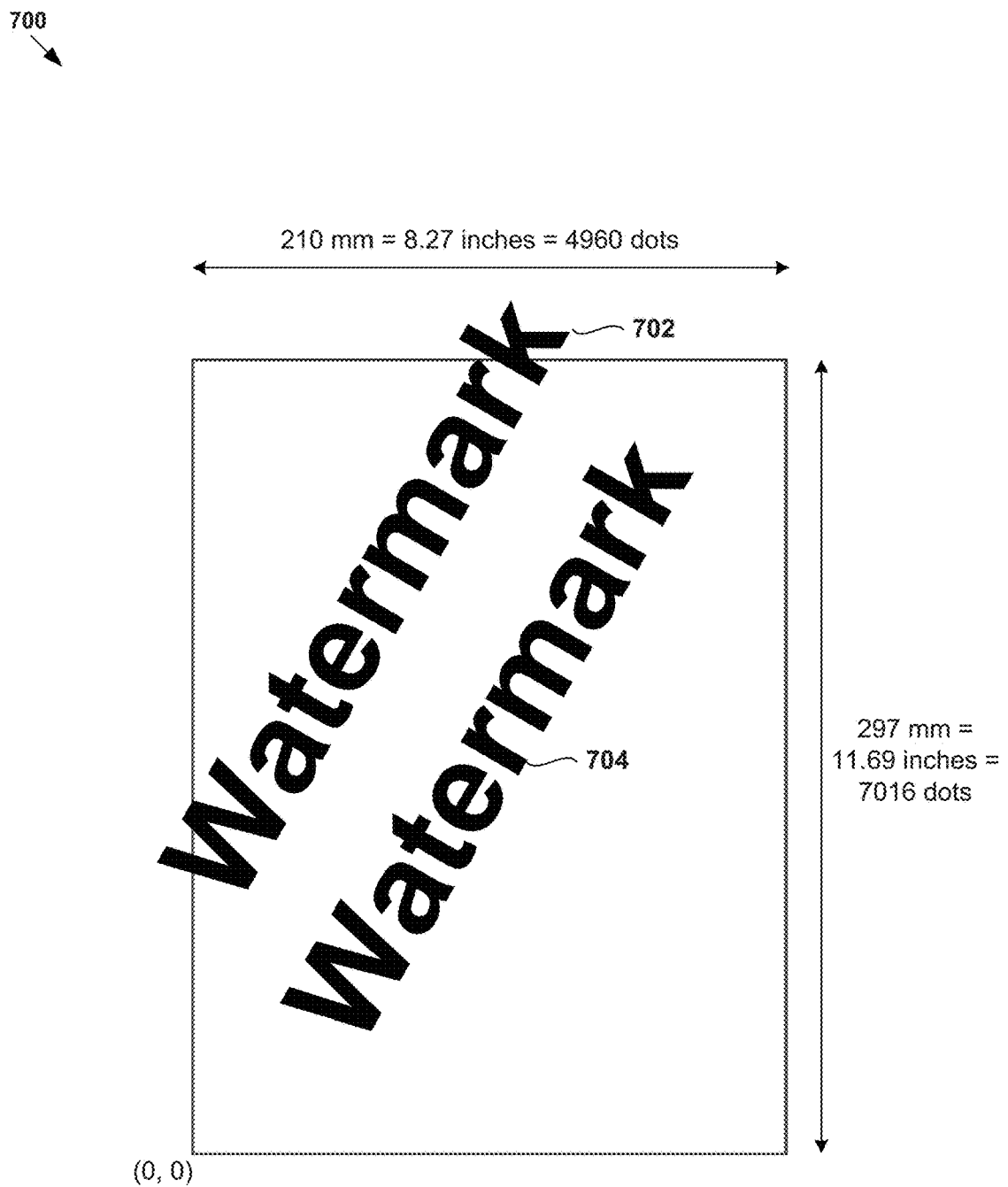
FIG. 7 illustrates example watermarks printed on a page.

FIG. 7 illustrates example watermarks 702 and 704 printed on a page 700, based on different coordinate calculations. If the coordinate space for displaying the watermark is not revised (e.g., recalculated), the result may be what is shown for the watermark 702, in which portions of some characters lie outside of the printable area of the page 700. In comparison, if recalculation/revision of the coordinate space is performed, all characters of the watermark 704 will fit within the boundaries of the page 700.

Figure 8:
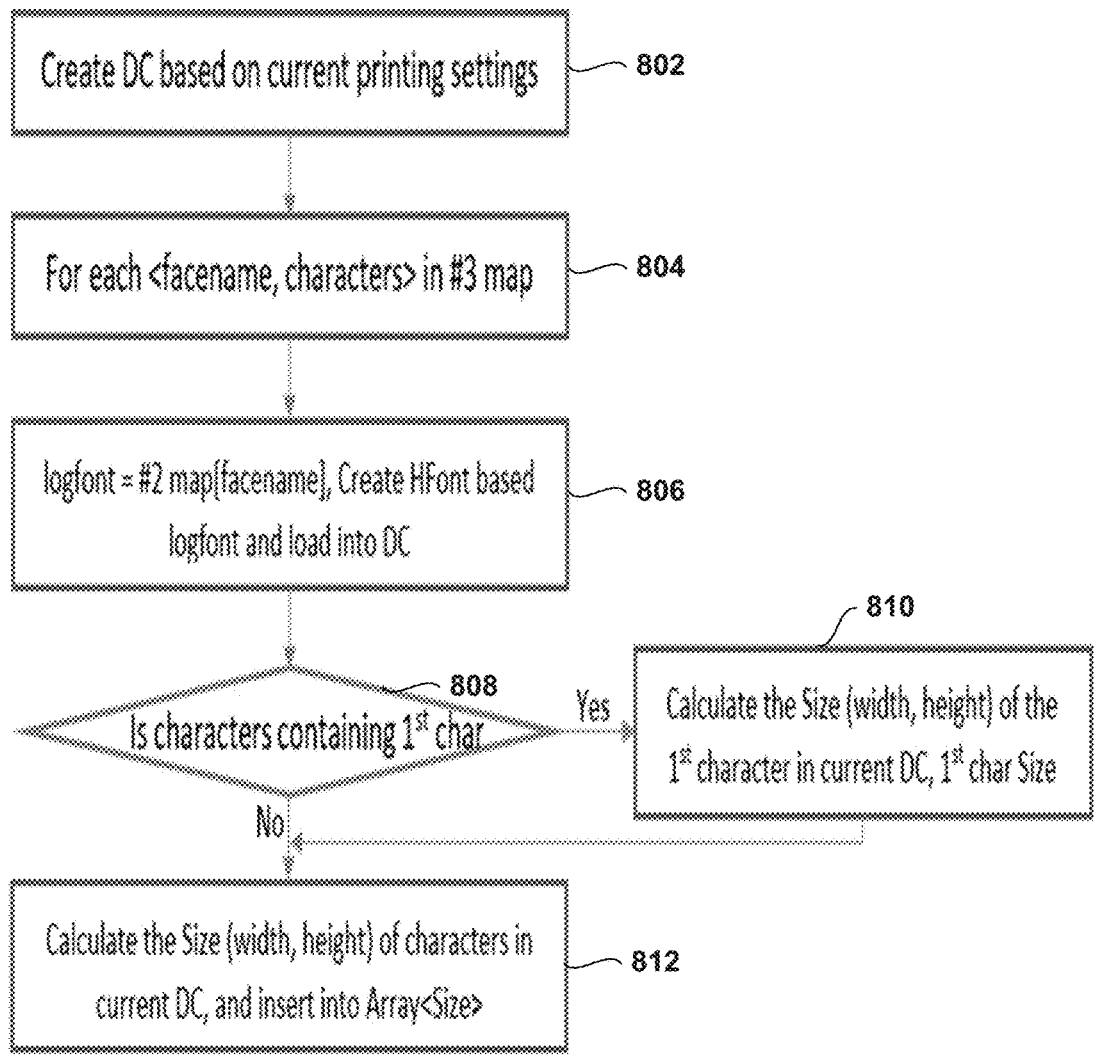
FIG. 8 is flowchart of an example method to calculate and revise a coordinate space.

FIG. 8 is flowchart of an example method 800 to calculate and revise a coordinate space. A device context (DC) is created at a block 82 based at least in part on current printer settings. The DC may specify, for example, paper size, dots per inch (DPI), left/right and top/bottom margins, other width/height dimensions, etc.

For each <facename, characters> in map #3 at a block 804, method 800 then iterates through blocks 806-812 since the various characters may have different width and height sizes, even if they are all the same font.

At the block 806, method 800 creates a logfont handle and select this into the DC (device context) based on the retrieved logfont, Then, method 800 can use this DC to calculate the total characters' size. The logfont contains several pieces of information regarding the font used in the watermark text (e.g., the size, style, etc.). Only if method 800 selects the correct logfont handle into the DC can the correct characters' size be calculated.

At the block 808, method 800 determines whether the current character is the first character in the watermark. If the character is the first character, then method 800 proceeds to block 810 to calculate the size (width and height) of this first character in the current DC. If the character is not the first character, then method 800 proceeds to block 812 to calculate the size (width and height) of the character in the current DC. The calculated sizes from blocks 810 and 812 are inserted into an array.

Figure 9:
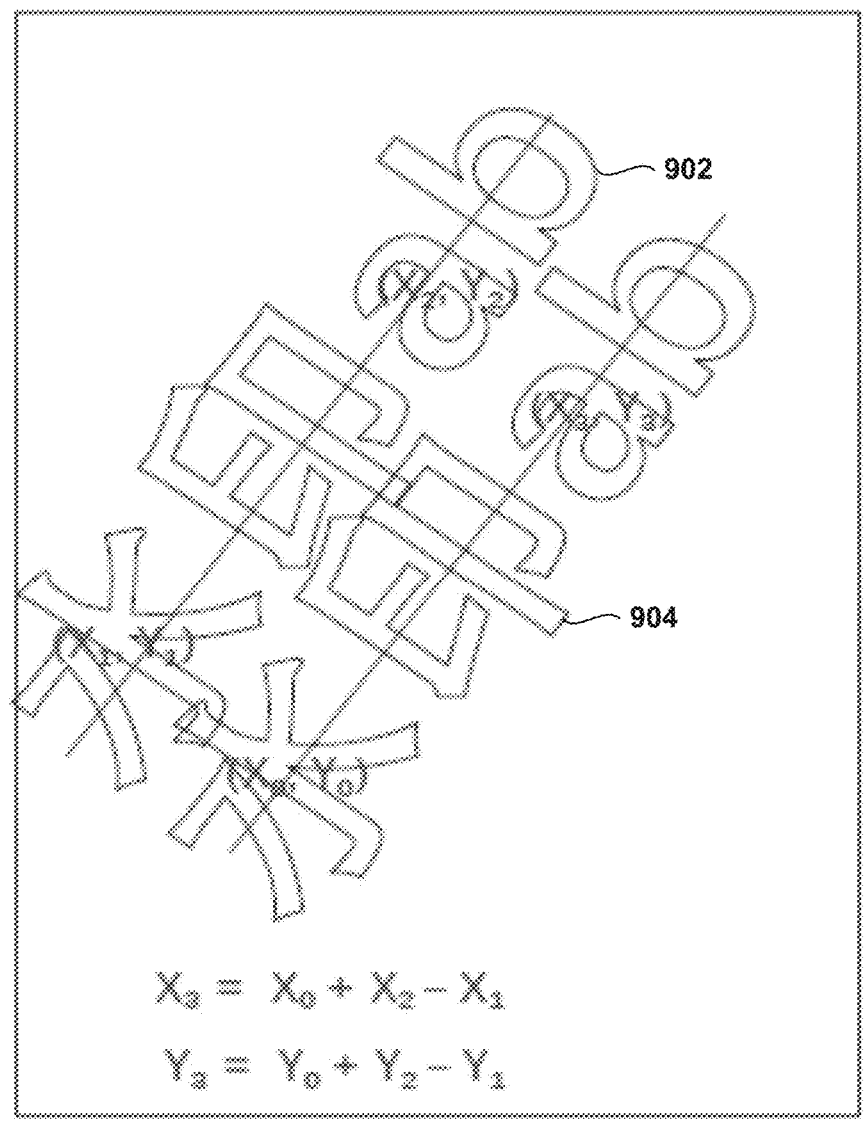
FIG. 9 further illustrates watermarks with respect to coordinate spaces on a page.

FIG. 9 further illustrates watermarks 902 and 904 with respect to coordinate spaces on a page 900. The watermark 902 lies along a diagonal line between points $X_1,Y_1$ and $X_2,Y_2$. The watermark 904 lies along a diagonal line between points $X_0,Y_0$ and $X_3,Y_3$. As depicted and in a manner similar to what is shown in FIG. 7, the watermark 902 has portions of some characters that lie outside of the printable area of page 900, whereas the watermark 904 has all portions of its characters within the printable area of page 900. Coordinate space calculation and revision can be performed so that watermark 902 can be properly positioned within the printable area of page 900, in a manner depicted for watermark 904

For example, the point coordinates can be calculated or related as follows:

$$X_3 = X_0 + X_2 - X_1$$

$$Y_3 = Y_0 + Y_2 - Y_1$$

Figure 10:
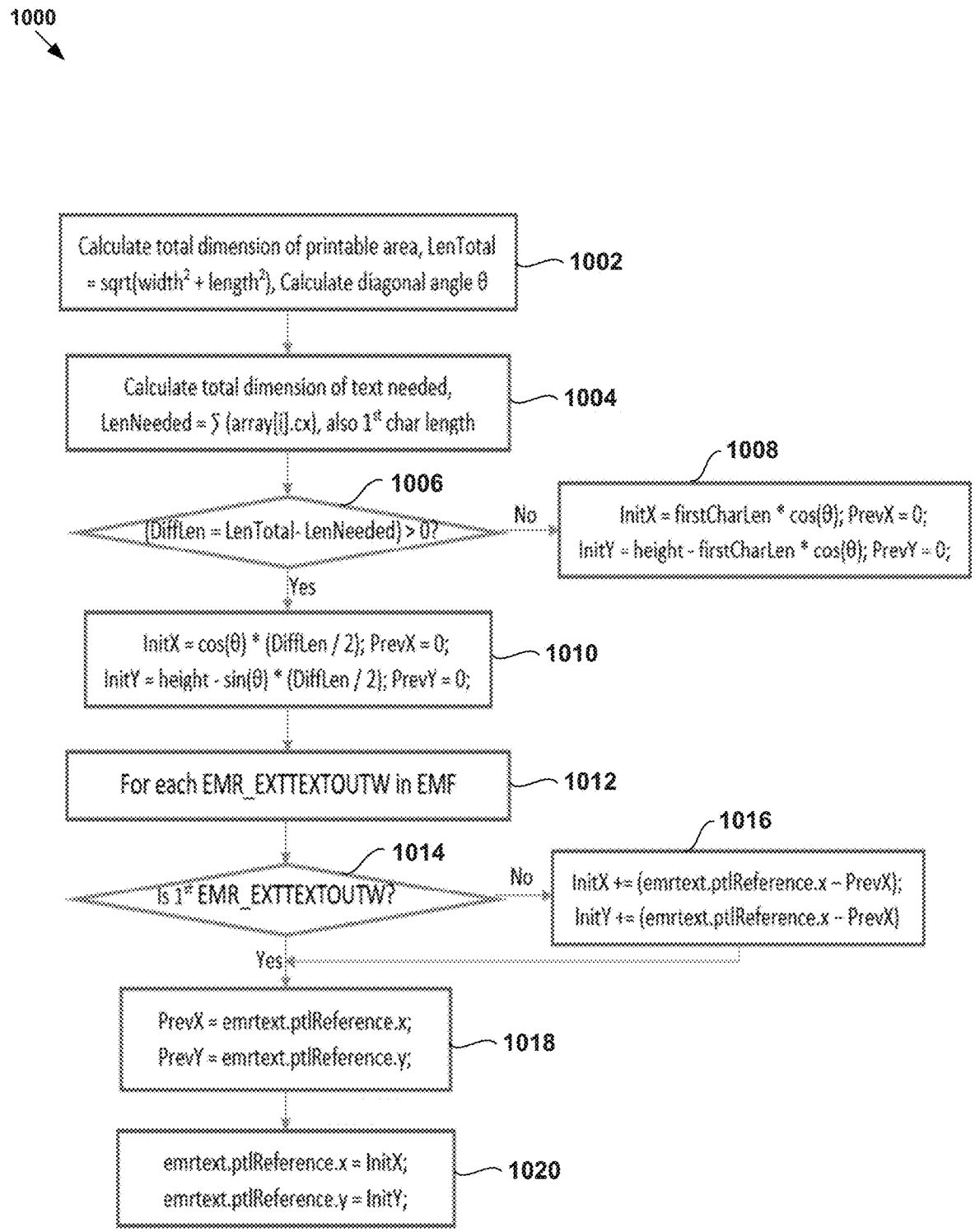
FIG. 10 is a flowchart of an example method to calculate and revise a coordinate space.

FIG. 10 is a flowchart of an example method 1000 to calculate and revise a coordinate space. At a block 1002, method 1000 calculates the total dimension of the printable area of the page, the length of the diagonal of the page, and the diagonal angle θ. The printable area of the page is based on its width and height (or length), and varies from one paper size to another and DPI setting. For example, if the paper size is A4 and DPI is 600, the length is 7016 dots and the width is 4960 dots. The diagonal length (LenTotal) is the square root of width²+length², and the diagonal angle θ is 54.74 degrees.

At a block 1004, method 1000 calculates the total dimension of text that is needed (e.g., LenNeeded along the diagonal) for the watermark. LenNeeded may be calculated at block 1004 by summing the array values of character lengths (from block 812 in FIG. 8), and also the first character's length.

At a block 1006, method 1000 checks whether a difference in lengths (DiffLen) between LenTotal and LenNeeded is greater than 0. If not greater than zero (meaning that the text of the watermark exceeds the edges of the printable area of the page, and so may get truncated if the characters not re-positioned to the appropriate location in the printable area), then at a block 1008, method 1000 calculates/revises new initial point(s) for the watermark.

If DiffLen>0 (meaning that the text of the watermark will fit within the edges of the printable area of the page), then at a block 1010, method 1000 calculates the initial points (InitX, InitY) for the first characters (e.g., first characters in EMR_EXTTEXTOUTW).

At blocks 1012-1020, method 1000 revises the points in the records EMR_EXTTEXTOUTW. With reference back to FIG. 9, the analyzed EMF result contains two records about EMR_EXTTEXTOUTW: one record for the watermark 902 contains the characters of " "水印",", and the other record for the watermark 904 contains the characters "ab", and each watermark will use a different facename/font to print/draw each of them.

The original points in these two records are (X1, Y1) and (X2, Y2). For the record EMR_EXTTEXTOUTW that contains the characters ""水印",", the point in EXTTEXTOUTW will be revised from (X1, Y1) to (InitX, InitY) in block 1020. The (PrevX, PrevY) will be revised to (X1, Y1).

For record EMR_EXTTEXTOUTW that contains the characters "ab", the point in EXTTEXTOUTW will be revised from (X2, Y2) to (InitX, InitY) in block 1020. The (InitX, InitY) is revised to the following in block 1016:

$$X_0 + X_2 - X_1$$

$$Y_0 + Y_2 - Y_1$$

In the above, X0 and Y0 is calculated in block 1010.

The coordinates (PrevX, PrevY) will be updated, and is used for the next record EXTTEXTOUTW if there is more text.

Figure 11:
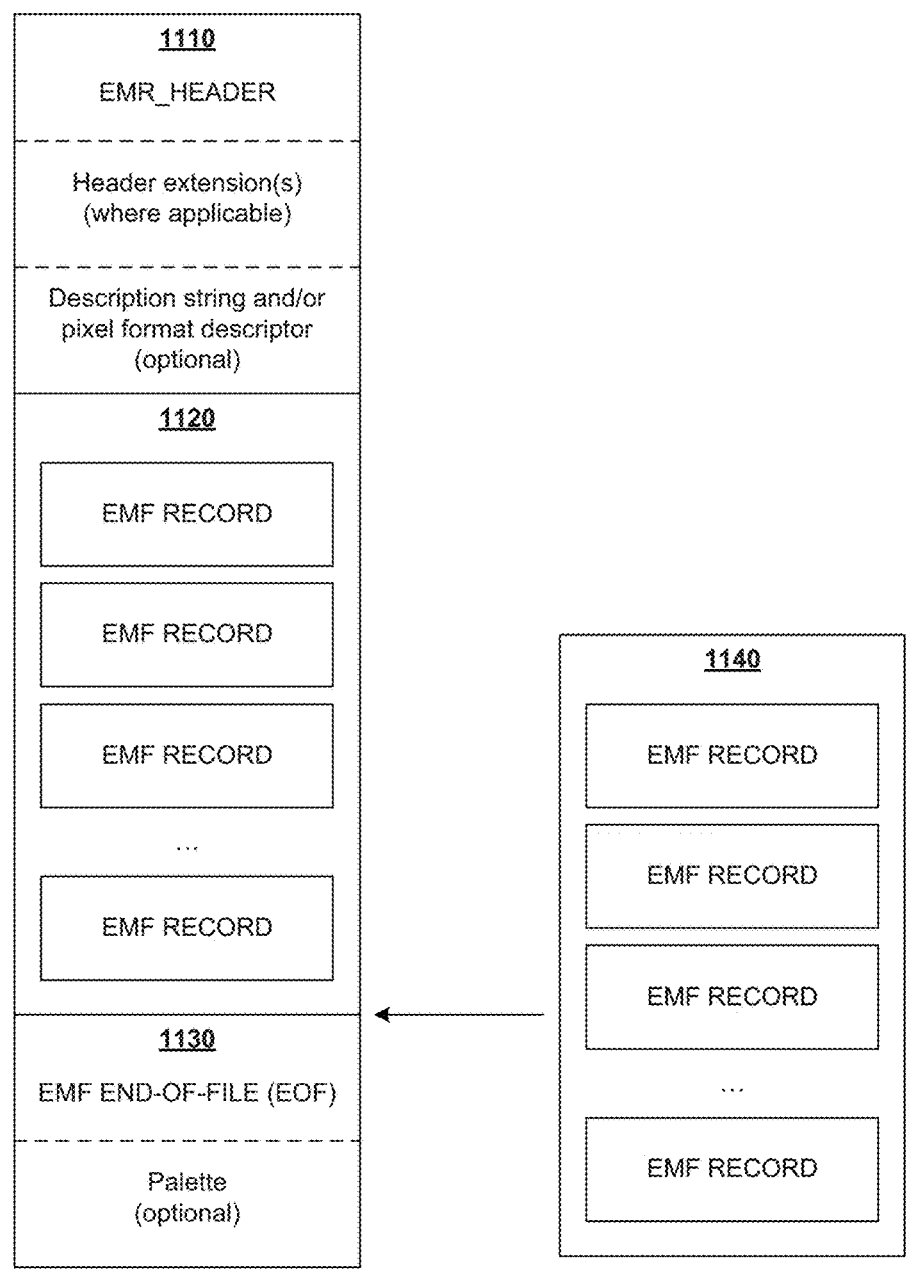
FIG. 11 is a schematic diagram illustrating insertion of EMF records for a watermark into an EMF structure.

To ensure that the watermark shows properly in the original source printing content (180 in FIG. 1), a location in the EMF structure needs to be chosen for insertion of the newly generated watermark-related EMF records. FIG. 11 is a schematic diagram illustrating insertion of EMF records for a watermark into an EMF structure 1100. Analogous to what is shown in FIG. 5, the EMF structure 1100 includes an EMF header 1110, a plurality of EMF records 1120, and an EMF end-of-file 1130. EMF records 1140 for a watermark, which have been generated based on the operations described above, are inserted into the EMF structure 1100. According to various embodiments, the location of insertion is immediately before the EMF end-of-file 1130.

Furthermore in some embodiments, some extra records may need to be inserted to set the device context (DC) to original status before rendering the watermark records. Drawing and printing is performed by using a current DC for coordinate space, font size, color, etc. An EMF record EMR_SAVEDC saves the current state of the playback device context into a stack, usually followed by an EMF record EMR_SELECTOBJECT.

An EMF record EMR_RESTOREDC restores the playback device context to a specified statue. The element SAVEDC needs to be negative: −1 represents the state that was most recently saved in the stack, −2 represents the state before that, etc. Various embodiments retrieve the original DC before drawing/printing the generated watermark records.

Figure 12:
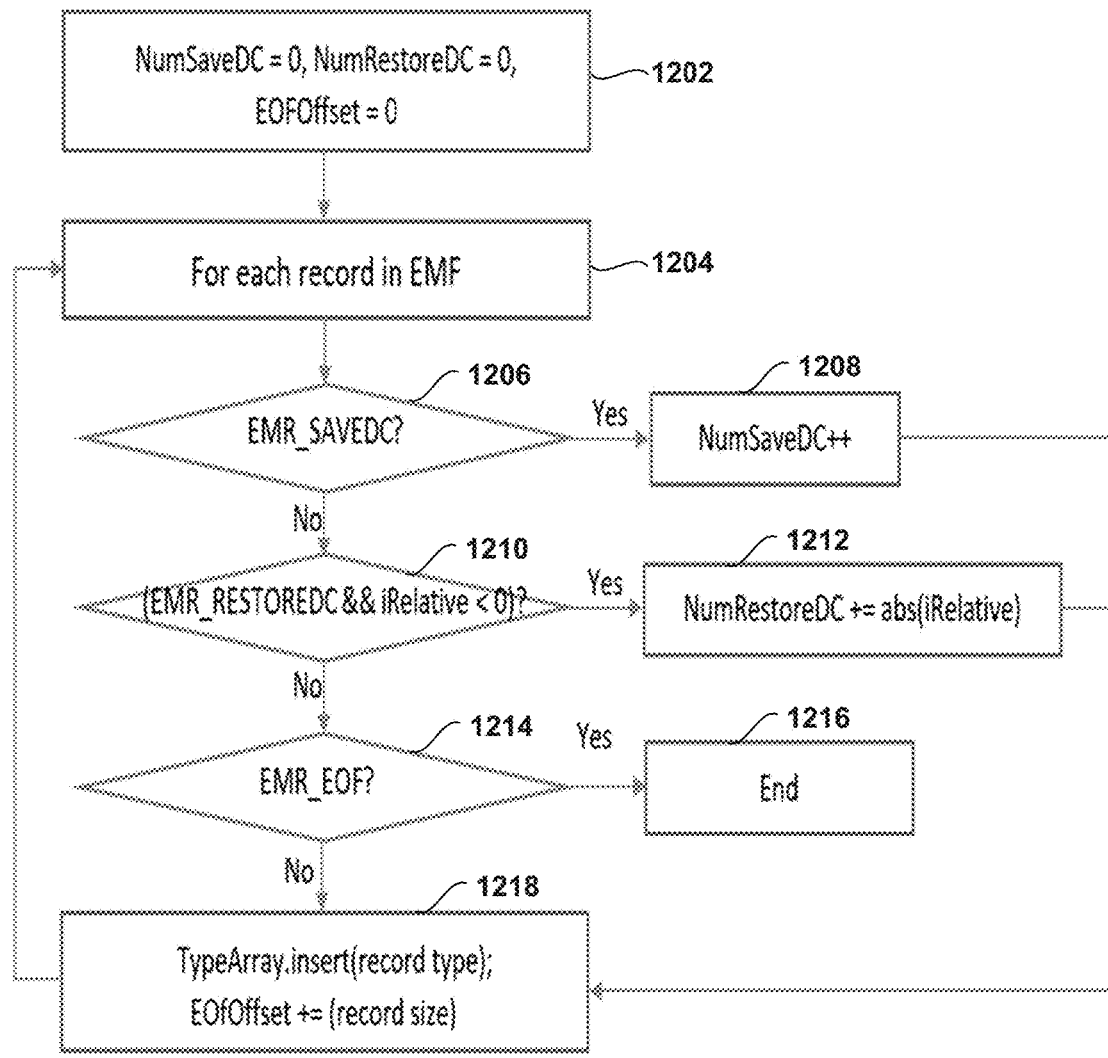
FIG. 12 is a flowchart of an example method to get the original device context and to find a proper location to insert the new generated watermark records.

FIG. 12 is a flowchart of an example method 1200 to get the original device context and to find a proper location to insert the new generated watermark records.

Figure 13:
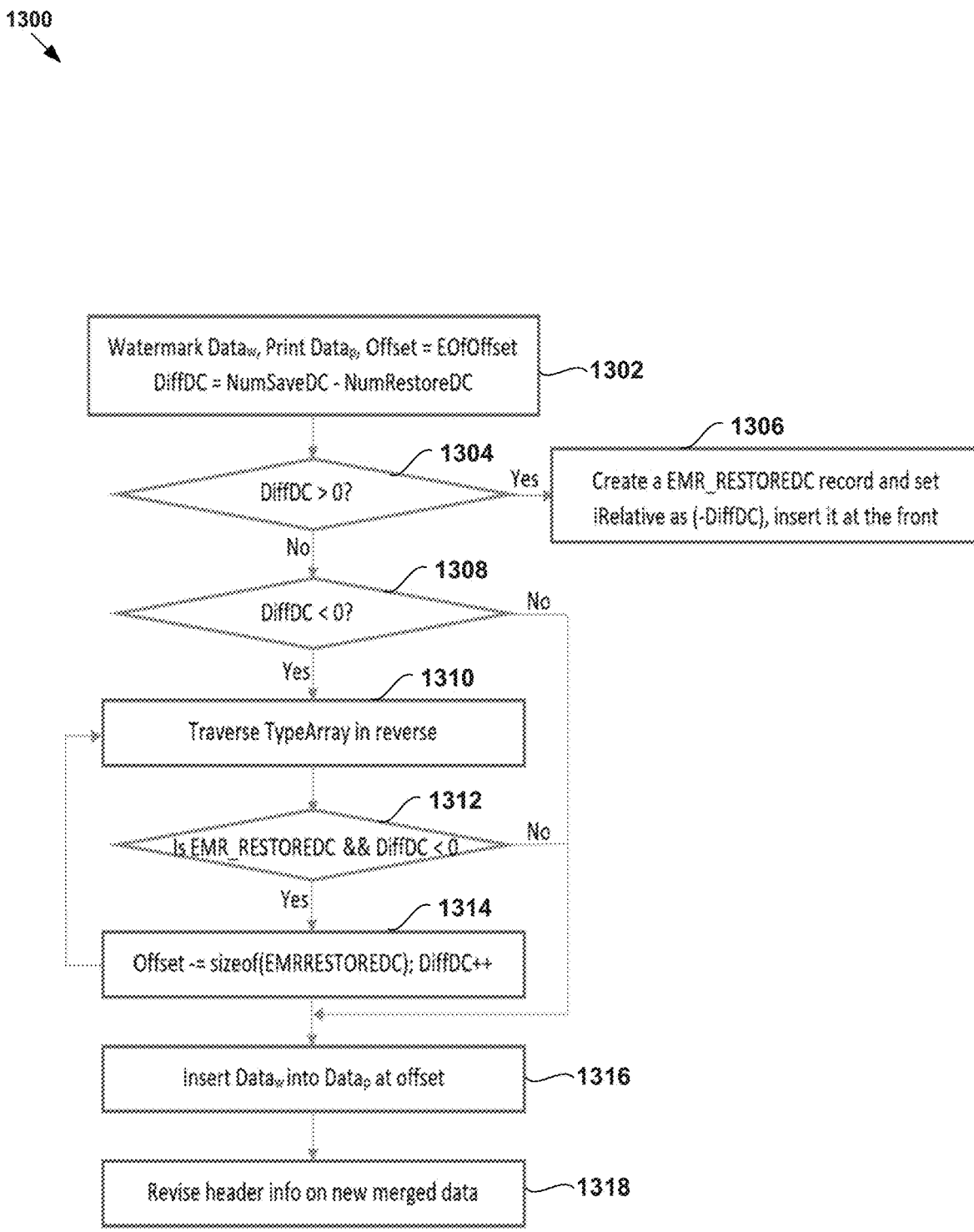
FIG. 13 is a flowchart of an example method to get the original device context and to find a proper location to insert the new generated watermark records.

At blocks 1202-1218, method 1200 retrieves some temporary results, which are used in FIG. 13 to get the original DC and correct location to insert the new generated watermark records. Four example results that are obtained in blocks 1202-1218 are: NumSaveDC (number of records about EMR_SAVEDC), NumRestoreDC (number of records about EMR_RESTOREDC), TypeArray (an array for each record type; the array index is the corresponding index of the EMF record in the EMF data), and EOFOffset (an offset of the record EMR_EOF from the begin of the EMF data).

At a block 1214, method 1200 checks whether the EMF end-of-file (EOF) has been reached. If yes, then method 1200 ends at a block 1216. Else, the watermark EMF record is inserted at 1218 and the EOF offset is incremented by the record size.

FIG. 13 is a flowchart of an example method 1300 to get the original device context and to find a proper location to insert the new generated watermark records. As previously explained above with respect to FIG. 12, results of method 1200 are used in method 1300 to get the original DC and correct location to insert the new generated watermark record, starting at a block 1302.

If DiffDC>0 (at a block 1304), this condition indicates that there is a need to insert one record about EMR_RESTOREDC at the head of the watermark records (at a block 1306). Then, when the EMR_RESTOREDC with value −DiffDC is played, the DC will be the original status, and watermark records can now be drawn/printed.

If DiffDC=0, this condition indicates that the current DC is the original DC (the DC before playing the record EMR_EOF). Method 1300 just needs to insert the watermark records before record EMR_EOF.

For Diff DC<0 (at a block 1308), this condition indicates that method 1300 needs to "remove" the number of DiffDC records in EMR_RESTOREDC. Method 1300 does not actually remove these records from the EMF data, but rather traverses these records and places the generated watermark records before the proper location (blocks 1310-1318).

Physical System(s)

As described using FIG. 1, computer system 110 may act as a client system for user 102 to access virtual desktop 125 supported by server 120. Depending on the desired implementation, virtual desktop 125 may be implemented using virtual machine(s) supported by server 120. In the following, example server computer systems will be explained using hosts 1410A-B, and VMs using VMs 1431-1434.

Figure 14:
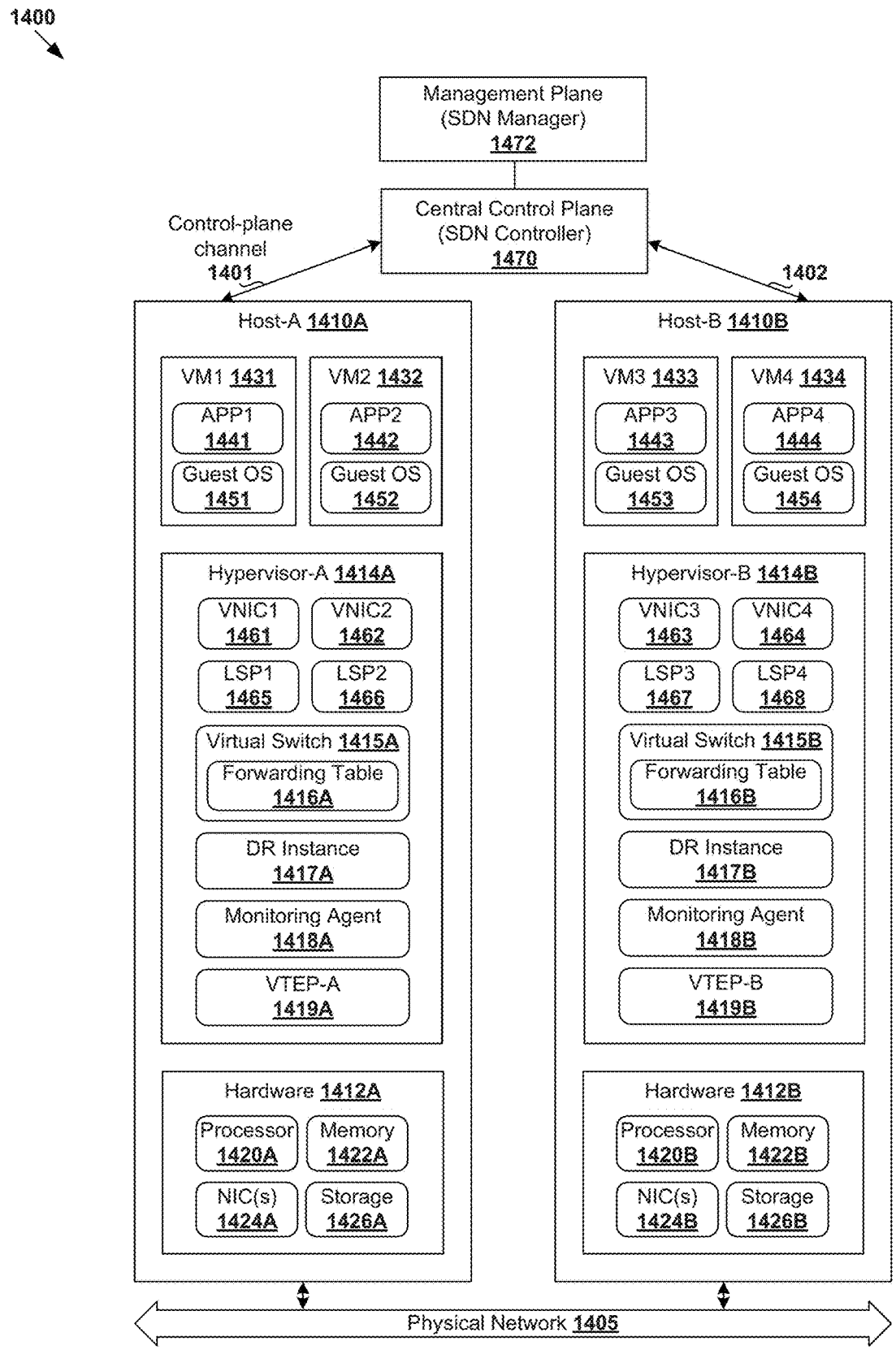
FIG. 14 is a schematic diagram illustrating an example physical view of hosts in a software-defined networking (SDN) environment.

In more detail, FIG. 14 which is a schematic diagram illustrating an example physical view of hosts in a software-defined networking (SDN) environment 1400. It should be understood that, depending on the desired implementation, SDN environment 1400 may include additional and/or alternative components than that shown in FIG. 14. In practice, SDN environment 1400 may include any number of hosts (also known as "computer systems," "computing devices", "host computers", "host devices", "physical servers", "server systems", "transport nodes," etc.).

SDN environment 1400 may include host-A 1410A as well as other hosts, such as host 1410B. Host 1410A/1410B may include suitable hardware 1412A/1412B and virtualization software (e.g., hypervisor-A 1414A, hypervisor-B 1414B) to support various VMs. For example, host-A 1410A may support VM1 1431 and VM2 1432, while VM3 1433 and VM4 1434 are supported by host-B 1410B. Hardware 1412A/1412B includes suitable physical components, such as central processing unit(s) (CPU(s)) or processor(s) 1420A/1420B; memory 1422A/1422B; physical network interface controllers (PNICs) 1424A/1424B; and storage disk(s) 1426A/1426B, etc.

Hypervisor 1414A/1414B maintains a mapping between underlying hardware 1412A/1412B and virtual resources allocated to respective VMs. Virtual resources are allocated to respective VMs 1431-1434 to support a guest operating system (OS; not shown for simplicity) and application(s); see 1441-1444, 1451-1454. For example, the virtual resources may include virtual CPU, guest physical memory, virtual disk, virtual network interface controller (VNIC), etc. Hardware resources may be emulated using virtual machine monitors (VMMs). For example in FIG. 14, VNICs 1461-1464 are virtual network adapters for VMs 1431-1434, respectively, and are emulated by corresponding VMMs (not shown) instantiated by their respective hypervisor at respective host-A 1410A and host-B 1410B.

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 1414A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 1470 and SDN manager 1472 are example network management entities in SDN environment 1400. One example of an SDN controller is the NSX controller component of VMware NSX® (available from VMware, Inc.) that operates on a central control plane. SDN controller 1470 may be a member of a controller cluster (not shown for simplicity) that is configurable using SDN manager 1472. Network management entity 1470/1472 may be implemented using physical machine(s), VM(s), or both. To send or receive control information, a local control plane (LCP) agent (not shown) on host 1410A/1410B may interact with SDN controller 1470 via control-plane channel 1401/1402.

Through virtualization of networking services in SDN environment 1400, logical networks (also referred to as overlay networks or logical overlay networks) may be provisioned, changed, stored, deleted and restored programmatically without having to reconfigure the underlying physical hardware architecture. Hypervisor 1414A/1414B implements virtual switch 1415A/1415B and logical distributed router (DR) instance 1417A/1417B to handle egress packets from, and ingress packets to, VMs 1431-1434. In SDN environment 1400, logical switches and logical DRs may be implemented in a distributed manner and can span multiple hosts.

For example, a logical switch (LS) may be deployed to provide logical layer-2 connectivity (i.e., an overlay network) to VMs 1431-1434. A logical switch may be implemented collectively by virtual switches 1415A-B and represented internally using forwarding tables 1416A-B at respective virtual switches 1415A-B. Forwarding tables 1416A-B may each include entries that collectively implement the respective logical switches. Further, logical DRs that provide logical layer-3 connectivity may be implemented collectively by DR instances 1417A-B and represented internally using routing tables (not shown) at respective DR instances 1417A-B. Each routing table may include entries that collectively implement the respective logical DRs.

Packets may be received from, or sent to, each VM via an associated logical port. For example, logical switch ports 1465-1468 (labelled "LSP1" to "LSP4") are associated with respective VMs 1431-1434. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 1415A-B, whereas a "virtual switch" may refer generally to a software switch or software implementation of a physical switch. In practice, there is usually a one-to-one mapping between a logical port on a logical switch and a virtual port on virtual switch 1415A/1415B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual eXtensible Local Area Network (VXLAN), Stateless Transport Tunneling (STT), Generic Network Virtualization Encapsulation (GENEVE), Generic Routing Encapsulation (GRE), etc. For example, VXLAN is a layer-2 overlay scheme on a layer-3 network that uses tunnel encapsulation to extend layer-2 segments across multiple hosts which may reside on different layer 2 physical networks. Hypervisor 1414A/1414B may implement virtual tunnel endpoint (VTEP) 1419A/1419B to encapsulate and decapsulate packets with an outer header (also known as a tunnel header) identifying the relevant logical overlay network (e.g., VNI). Hosts 1410A-B may maintain data-plane connectivity with each other via physical network 1405 to facilitate east-west communication among VMs 1431-1434.

Hosts 1410A-B may also maintain data-plane connectivity with cluster 110 of multiple (M) EDGE nodes 111-11M in FIG. 14 via physical network 1405 to facilitate northsouth traffic forwarding, such as between a VM (e.g., VM1 1431) and remote destination 104 at a different geographical site. Various examples for the case of M=3 will be described throughout the present disclosure. In practice, each EDGE node may be an entity that is implemented using one or more virtual machines (VMs) and/or physical machines (known as "bare metal machines") and capable of performing functionalities of a switch, router, bridge, gateway, edge appliance, etc. Each EDGE node may implement a logical service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, an EDGE node may be considered to be an exit point to an external network.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 14.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those of ordinary skill in the art having the benefit of this disclosure will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system at an agent side in a virtual desktop environment to add a watermark for printing at a client side, the method comprising:
 receiving a file associated with a print job that is sent from a virtual desktop at the agent side, wherein the file includes printing content related to a document to be printed at the client side;
 receiving settings information associated with a watermark to be added to the document, wherein the settings information includes text of the watermark, the text of the watermark comprising first text and second text, the settings information specifying a first font for the first text, wherein the second text is unable to be printed using the first font;
 analyzing the settings information and the file to identify a fallback font for the second text of the watermark;
 calculating a coordinate space on the document for the watermark based on the analysis and on the settings information;
 modifying the file to specify the fallback font and the calculated coordinate space to enable the second text of the watermark to print in the fallback font and to enable the watermark to print at a location on the document in accordance with the calculated coordinate space; and
 sending the modified file to the client side for printing of the document with the watermark.

2. The method of claim 1, wherein modifying the file includes inserting a plurality of records pertaining to the fallback font, the calculated coordinate space, and other watermark-related information at a location in the file before an end-of-file record of the file.

3. The method of claim 1, further comprising:
 retrieving an original device context pertaining to a playback device that executes the file for printing; and
 setting a current device context of the playback device back to the original device context, prior to the watermark being printed at the client side.

4. The method of claim 1, wherein calculating the coordinate space on the document for the watermark includes calculating the coordinate space based on the watermark being in a diagonal orientation on the document.

5. The method of claim 1, wherein calculating the coordinate space on the document for the watermark includes calculating the coordinate space based at least on a sum of sizes of character of the text of the watermark, an orientation of the watermark, a page size of the document, and a printable area of the document.

6. The method of claim 1, wherein the file comprises an enhanced metafile (EMF).

7. The method of claim 6, wherein the file comprises a first EMF record, and wherein modifying the file comprises splitting the first EMF record into a plurality of EMF records.

8. A non-transitory computer-readable storage medium that includes a set of instructions which, in response to execution by a processor of a computer system at an agent side in a virtual desktop environment, cause the processor to perform a method to add a watermark for printing at a client side, wherein the method comprises:
  receiving a file associated with a print job that is sent from a virtual desktop at the agent side, wherein the file includes printing content related to a document to be printed at the client side;
  receiving settings information associated with a watermark to be added to the document, wherein the settings information includes text of the watermark, the text of the watermark comprising first text and second text, the settings information specifying a first font for the first text, wherein the second text is unable to be printed using the first font;
  analyzing the settings information and the file to identify a fallback font for the second text of the watermark;
  calculating a coordinate space on the document for the watermark based on the analysis and on the settings information;
  modifying the file to specify the fallback font and the calculated coordinate space to enable the second text of the watermark to print in the fallback font and to enable the watermark to print at a location on the document in accordance with the calculated coordinate space; and
  sending the modified file to the client side for printing of the document with the watermark.

9. The non-transitory computer-readable storage medium of claim 8, wherein modifying the file includes inserting a plurality of records pertaining to the fallback font, the calculated coordinate space, and other watermark-related information at a location in the file before an end-of-file record of the file.

10. The non-transitory computer-readable storage medium of claim 8, wherein the method further comprises:
  retrieving an original device context pertaining to a playback device that executes the file for printing; and
  setting a current device context of the playback device back to the original device context, prior to the watermark being printed at the client side.

11. The non-transitory computer-readable storage medium of claim 8, wherein calculating the coordinate space on the document for the watermark includes calculating the coordinate space based on the watermark being in a diagonal orientation on the document.

12. The non-transitory computer-readable storage medium of claim 8, wherein calculating the coordinate space on the document for the watermark includes calculating the coordinate space based at least on a sum of sizes of character of the text of the watermark, an orientation of the watermark, a page size of the document, and a printable area of the document.

13. The non-transitory computer-readable storage medium of claim 8, wherein the file comprises an enhanced metafile (EMF).

14. The non-transitory computer-readable storage medium of claim 13, wherein the file comprises a first EMF record, and wherein modifying the file comprises splitting the first EMF record into a plurality of EMF records.

15. A computer system at an agent side in a virtual desktop environment, the computer system comprising:
  a processor; and
  a non-transitory computer-readable storage medium that includes a set of instructions which, in response to execution by the processor, cause the processor to perform operations to add a watermark for printing at a client side, wherein the operations include:
    receive a file associated with a print job that is sent from a virtual desktop at the agent side, wherein the file includes printing content related to a document to be printed at the client side;
    receive settings information associated with a watermark to be added to the document, wherein the settings information includes text of the watermark, the text of the watermark comprising first text and second text, the settings information specifying a first font for the first text, wherein the second text is unable to be printed using the first font;
    analyze the settings information and the file to identify a fallback font for the second text of the watermark;
    calculate a coordinate space on the document for the watermark based on the analysis and on the settings information;
    modify the file to specify the fallback font and the calculated coordinate space to enable the second text of the watermark to print in the fallback font and to enable the watermark to print at a location on the document in accordance with the calculated coordinate space; and
    send the modified file to the client side for printing of the document with the watermark.

16. The computer system of claim 15, wherein the operations to modify the file include operations to insert a plurality of records pertaining to the fallback font, the calculated coordinate space, and other watermark-related information at a location in the file before an end-of-file record of the file.

17. The computer system of claim 15, wherein the operations further include:
  retrieve an original device context pertaining to a playback device that executes the file for printing; and
  set a current device context of the playback device back to the original device context, prior to the watermark being printed at the client side.

18. The computer system of claim 15, wherein the operations to calculate the coordinate space on the document for the watermark include operations to calculate the coordinate space based on the watermark being in a diagonal orientation on the document.

19. The computer system of claim 15, wherein the operations to calculate the coordinate space on the document for the watermark include operations to calculate the coordinate space based at least on a sum of sizes of character of the text of the watermark, an orientation of the watermark, a page size of the document, and a printable area of the document.

20. The computer system of claim 15, wherein the file comprises an enhanced metafile (EMF).

21. The computer system of claim 20, wherein the file comprises a first EMF record, and wherein modifying the file comprises splitting the first EMF record into a plurality of EMF records.

* * * * *